United States Patent [19]
Haas et al.

[11] 3,852,361
[45] Dec. 3, 1974

[54] PRODUCTION OF FORMALDEHYDE
[75] Inventors: Hans Haas; Heinrich Sperber; Wilhelm Friedrichsen, all of Ludwigshafen, Germany
[73] Assignee: Badische Anilin- & Soda-Fabrik Aktiengesellschaft, Ludwigshafen/Rhein, Germany
[22] Filed: June 22, 1970
[21] Appl. No.: 48,444

[30] Foreign Application Priority Data
June 28, 1969 Germany.......................... 1932892

[52] U.S. Cl................................ 260/603 C, 252/457
[51] Int. Cl............................................. C07c 45/16
[58] Field of Search............................. 260/603 HF

[56] References Cited
UNITED STATES PATENTS
1,913,405  6/1933  Meharg et al. ............... 260/603 HF
2,812,308  11/1957  Shelton et al................. 260/603 HF
3,152,997  10/1964  Natta et al..................... 260/603 HF
3,529,020  9/1970  Landis........................... 260/603 HF Primary Examiner—Bernard Helfin
Assistant Examiner—R. H. Liles
Attorney, Agent, or Firm—Johnston, Keil, Thompson & Shurtleff

[57] ABSTRACT

The production of formaldehyde by oxidation of methanol in the presence of a catalyst in the form of oxides of iron and of molybdenum on a silicate carrier. The formaldehyde which can be prepared according to the process of the invention is a disinfectant, tanning material, reducing agent and valuable starting material for the production of synthetic resins, adhesives, plastics and auxiliaries for many industrial fields.

6 Claims, No Drawings

PRODUCTION OF FORMALDEHYDE

The invention relates to a process for the production of formaldehyde by oxidation of methanol in the presence of a catalyst in the form of oxides of iron and of molybdenum on a silicate carrier.

It is known from German Printed Application No. 1,144,252 that methanol can be oxidized to formaldehyde in the presence of iron oxide and molybdenum oxide without a carrier. An appropriate catalyst, which also contains cobalt oxide, is described in German Patent Specification No. 1,162,344.

German Printed Application No. 1,063,141 teaches the oxidation in the presence of a catalyst supported on carbide and/or iron oxide. Silicon dioxide globules are expressly mentioned as an unsuitable carrier material in lines 37 to 45 of column 2. Porous sintered silicon carbides having a particle size from 25 to 0.3 mm, particularly from 1.25 to 6.25 mm, are preferred.

In all these methods the yields and space-time yields are unsatisfactory, especially in industrial-scale production.

It is an object of this invention to provide a new process for the production of formaldehyde which gives better yields, better space-time yields and higher purity combined with long catalyst life.

This and other objects of the invention are achieved and the production of formaldehyde by oxidation of methanol in the presence of a catalyst containing iron oxide and molydenum oxide on a carrier of a silicon compound is advantageously carried out by using a catalyst which contains from 5 to 20% by weight of oxides of iron and of molybdenum on a silicate carrier and which consists of particles having a diameter of from 4 to 12 millimeters and an internal surface area of less than 10 square meters per gram.

As compared with prior art methods, the process according to the invention surprisingly gives formaldehyde in better yields, generally of from 94 to 99% of the theory, better space-time yields and higher purity combined with long catalyst life. Impurities, for example formic acid and unreacted methanol, occur to a smaller extent with better yields of end product.

The reaction is carried out with methanol and oxygen, generally in admixture with inert gas, for example in the form of air. In general an amount of from 5 to 15%, advantageously from 5 to 10%, by weight of methanol based on the weight of air is used. In continuous operation, it is advantageous to allow to react at least 3, preferably from 4 to 10, cubic meters of the mixture of air and methanol per hour per liter of catalyst in the presence of the catalyst.

The catalyst contains 5 to 20%, preferably 6 to 15%, by weight of the oxides of iron and molybdenum, based on the silicate carrier. As a rule the oxides are used in a ratio of 10 to 45% by weight of $Fe_2O_3$ to 90 to 55% by weight of $MoO_3$, preferably from 10 to 30% of $Fe_2O_3$ to 90 to 70% by weight of $MoO_3$. Cobalt, nickel, chromium, tungsten or aluminum oxide or phosphorus trioxide or pentoxide may if desired be present in an amount of from 0.5 to 5%, preferably from 0.5 to 3%, by weight based on the silicate carrier.

Alkali metal silicates, alkaline-earth silicates, particularly calcium silicate, magnesium silicate, zinc silicate, cerium silicate, zirconium silicate, aluminum silicate or mixtures of the same are usually used as the silicate carrier. The silicates may also be alumosilicates, borosilicates or zeolites; the corresponding magnesium silicates are preferred. They may contain additives such as alkali metal sulfates or oxides, for example soda glasses, sulfate glasses, potash glasses, potassium sulfate glasses. Silicates having different cations in admixture are also suitable, for example in the form of silicates of the type of olivine, phenacite, titanite, chrysolite, benitoite, axinite, cordierite, milarite, steatite, orthoclase, plagioclase and albite.

The catalyst particles may be of any shape but preferably of globular shape, having a diameter of from 4 to 12, preferably from 6 to 10, millimeters and an internal surface area of less than 10, preferably from 0.01 to 5, square meters per gram of catalyst. In general a globular silicate carrier which has been treated with an aqueous solution of molybdenum and iron salts is used. Examples of suitable salts are ammonium heptamolybdate, iron chloride, iron ammonium oxalate, iron citrate, iron nitrate, iron molybdate, and iron acetate. If desired corresponding salts of metals which, as has been stated above, may be present as oxides in the catalyst, for example cobalt oxalate, cobalt molybdate, cobalt nitrate, silicon tetrachloride and titanium dioxide.

Treatment of the carrier with the salt solution may be carried out in any appropriate way, for example by dripping on, spraying, sprinkling, or soaking, and the amount of water may be chosen at will. Suspensions of appropriate metal compounds may be used instead of solutions. It is advantageous to use 10 to 20wt.% salt solutions and to carry out the treatment at a temperature of from 100° to 300°C, for example in a coating drum, or a rotary dryer. The catalyst is then dried and activated by heating, for example for from four to twelve hours at a temperature of from 300° to 550°C, preferably from 350° to 450°C, particularly from 400° to 420°C, so that the salts are converted into the oxides.

Oxidation of the methanol is carried out as a rule at a temperature of from 280° to 420°C, preferably from 320° to 370°C, at atmospheric or superatmospheric pressure, batchwise or, preferably, continuously. The reaction may be carried out as follows. A reactor is filled with the catalyst prepared as described above. It is advantageous to use as the reactor a tubular reactor having external cooling and any number of tubes, for example up to 15,000, which are advantageously devoid of baffles or other inserts. In a preferred embodiment, the internal diameter of the tubes is at least 25 millimeters, particularly from 30 to 34 millimeters, and the length of the tubes from 0.5 meter to 5 meters.

It is advantageous to use mineral oils having a boiling point of from 300° to 400°C or salt melts, for example a mixture of potassium nitrate and sodium nitrite, as coolant. The temperature of the coolant is kept as a rule at from 300° to 400°C, particularly from 330° to 380°C.

After the reactor has been filled, a mixture of air and methanol is passed therethrough at the abovementioned reaction temperature and under the said reaction conditions. Formaldehyde in the form of a 30 to 60% by weight solution is separated from the reaction mixture leaving the reactor by a conventional method, for example by washing the mixture countercurrently with water one or more times.

Formaldehyde which can be prepared by the process according to the invention is a disinfectant, tanning agent, reducing agent and a valuable starting material for the production of synthetic resins, adhesives, plastics and auxiliaries for many industrial fields. Ullmanns Encyklopaedie der technischen Chemie, volume 7, page 670, may be referred to for details of uses.

The invention is further illustrated by the following Examples, in which parts are by weight.

EXAMPLE 1

A mixture of 88 parts of iron nitrate, 5 parts of ammonium bichromate and 14 parts of ammonium phosphate in 300 parts of water is added to a solution of 96 parts of ammonium heptamolybdate in 1000 parts of water at 60°C with good mixing. The suspension formed is supplied in the course of 100 minutes to a coating drum containing 1000 parts of calcined magnesium silicate in the form of balls having a diamter of 5.5 mm. The balls have been previously heated to 200° to 250°C. After the catalytic suspensions has been supplied, the balls are dried and then heated for fifteen hours at 420°C. The catalyst balls obtained contain 10% by weight of metal oxides and have a diameter of 5.5 millimeters and a surface area of 0.8 square meter per gram of catalyst. The oxides contain 50% by weight of molybdenum, 11.7% by weight of iron and 1.9% by weight each of chromium and phosphorus.

A tube reactor containing 10,000 tubes having a diameter of 32 mm and a length of 1.5 meters is filled with 1300 parts of catalyst. The tubes are surrounded by oil having a boiling point of 303°C. The temperature of the oil is kept at 378°C during operation and controlled outside the reactor. A gaseous mixture of 121 parts of air and 9.3 parts of methanol is passed per hour through the catalyst zone at 380°C. The reaction mixture leaving the reactor is cooled to 25°C and washed twice countercurrently with water. 8.45 Parts per hour of formaldehyde calculated 100% (97% of the theory) is obtained together with 0.3 part of methanol and less than 0.01 part of formic acid. The 30 to 40% by weight solutions can be concentrated by distillation or supplied direct for further processing. Even after forty weeks' continuous operation further use may be made of the catalyst without loss in yield.

EXAMPLE 2

With the production of the catalyst and the reaction being carried out as in Example 1, 59 parts of iron(III) chloride is used instead of iron nitrate. The particle diameter and the particle surface area of the catalyst are the same as in Example 1. The same result is obtained as in Example 1.

EXAMPLE 3

The catalyst is prepared in a manner analogous to that in Example 1. The catalyst balls contain 57.5% by weight of molybdenum and 9.6% by weight of iron (instead of 50% by weight of molybdenum, 11.7% by weight of iron, 1.9% by weight of chromium and 1.9% by weight of phosphorus). The diameter and surface area of the particles of catalyst are the same as in Example 1. The same result is obtained as in Example 1.

EXAMPLE 4

158 parts of ammonium heptamolybdate is dissolved in 1000 parts of water at 60°C. 104 parts of iron(III)nitrate is dissolved in 300 parts of water. The two solutions are mixed together with vigorous stirring. 12 parts of silicon tetrachloride is added to the resulting fine suspension while stirring. The suspension formed is sprayed onto 1000 parts of magnesium silicate balls at 245°C, the balls are dried and then heated for fifteen hours at 400°C. Catalyst balls containing 12.5% by weight of metal oxides are obtained. The particles have the same size as in Example 1 and the surface area of the particles is 1.2 square meters per gram of catalyst. Reaction is carried out analogously to Example 1. 8.4 parts of formaldehyde calculated 100% (96.5% of the theory) per hour is obtained.

We claim:

1. A process for the production of formaldehyde which comprises oxidizing methanol with oxygen at 280°–420°C. in the presence of a catalyst composed of iron oxide and molybdenum oxide deposited on a carrier consisting essentially of magnesium silicate particles having diameters of 4–12 millimeters and an internal surface area of 0.01 to 5 square meters per gram of said catalyst, said catalyst containing 5–20% by weight, based on said magnesium silicate carrier, of said iron oxide and said molybdenum oxide.

2. A process as claimed in claim 1, wherein said catalyst contains 6–15% by weight of said oxides of iron and molybdenum.

3. A process as claimed in claim 1, wherein said iron and molybdenum oxides deposited on said carrier particles have a ratio in the range of 10–45% by weight of $Fe_2O_3$ and 90–55% by weight of $MoO_3$.

4. A process as claimed in claim 1, wherein said iron and molybdenum oxides deposited on said carrier particles have a ratio in the range of 10–30% by weight of $Fe_2O_3$ and 90–70% by weight of $MoO_3$.

5. A process as claimed in claim 1, wherein said magnesium silicate particles have diameters in the range of 6–10 millimeters.

6. A process as claimed in claim 1 wherein the reaction temperature is in the range of 320°–370°C.

* * * * *